United States Patent [19]

Perl

[11] Patent Number: 4,560,830
[45] Date of Patent: Dec. 24, 1985

[54] DIGITIZER TABLET WITH COARSE AND FINE POSITION DETERMINATION

[75] Inventor: Julius Perl, Burlington, Mass.

[73] Assignee: Schlumberger Technology Corporation, Houston, Tex.

[21] Appl. No.: 564,267

[22] Filed: Dec. 22, 1983

[51] Int. Cl.[4] .............................................. G08C 21/00
[52] U.S. Cl. ..................................................... 178/19
[58] Field of Search ............................. 178/18, 19, 20; 340/706, 709, 718; 364/520

[56] References Cited

U.S. PATENT DOCUMENTS

| | | | |
|---|---|---|---|
| 3,342,935 | 9/1967 | Leifer et al. | 178/18 |
| 3,705,956 | 12/1972 | Dertouzos | 178/18 |
| 3,732,557 | 5/1973 | Evans et al. | 178/19 |
| 3,819,857 | 6/1974 | Inokuchi | 170/19 |
| 3,975,592 | 8/1976 | Carvey | 178/18 |
| 3,999,012 | 12/1976 | Dym | 178/18 |

*Primary Examiner*—Stafford D. Schreyer
*Attorney, Agent, or Firm*—Kenneth Olsen; Thomas Langer; William B. Kempler

[57] ABSTRACT

A grid of electrical conductors for locating the position of a stylus utilizes a reduced number of line drivers. The grid utilizes twice as many conductors as required by conventional grids for a given resolution. The conductors are divided into coarse and fine sets which are interleaved and coextensive in the long dimension of the conductors. The coarse set is divided into subsets which consist of a predetermined number of conductors in close proximity to each other, adjacent coarse conductors being separated by only one fine conductor. The fine set is divided into a number of subsets equal to the number of conductors in each coarse subset. The number of conductors in each fine subset equals the number of coarse subsets. Each of the conductors of the fine subsets is spaced one from the other by a number of fine conductors equal to the number of coarse subsets. The conductors of each subset are connected to each other and to the output of a single driver. The position of the stylus is located by scanning the coarse conductors to determine a coarse position and by scanning the fine conductors to determine a fine position. The coarse and fine positions are combined to produce the location of the stylus.

20 Claims, 3 Drawing Figures

DIGITIZER TABLET WITH COARSE AND FINE POSITION DETERMINATION

BACKGROUND OF THE INVENTION

This invention relates to a method and apparatus for locating the position of a stylus, or pen, on a grid of electrical conductors. This technique is also applicable to other devices such as a mouse or puck. These grids are generally employed in digital tablets for use in inputting data to a digital computer system.

FIG. 1 illustrates a prior art apparatus generally indicated as 100 for determining the location of a stylus in the vertical, or Y, direction. A typical grid determines the location of the stylus in the horizontal, or X, direction as well; this being omitted from the drawing for the sake of clarity. The grid comprises 16 horizontal conductive lines 102a through 102p, each of which is connected to a respective driver 104a through 104p. The conductors of the grid are substantially parallel to each other and are equally spaced one from the other. The conductors are normally formed as printed circuit conductors on one side of a printed circuit board. The surface of the grid may be covered with a protective layer of plastic or other non-conductive material.

In operation, a pen or stylus containing a capacitive or inductive pick up is placed on the surface of the grid. The drivers are sequentially energized by suitable electronics (not shown) connected to each of the input terminals 106a through 106p of the drivers. The drivers in turn energize the conductors 102 to which they are connected. Each time a conductor is activated, the voltage induced in or capacitively coupled to an inductive or capacitive pickup in the stylus is amplified and the amplitude of this signal is measured and stored. The largest stored amplitude represents the conductor of the grid to which the stylus is closest, thus giving a coarse determination of the location of the stylus. The exact position of the stylus between adjacent conductors may be located with greater precision by applying well-known interpolation techniques to the stored voltages.

The main disadvantage of this prior art technique is the requirement that a driver be provided for each one of the conductors in the grid. In grids employing a large number of conductors, a correspondingly large number of drivers is required. The large number of drivers and large number of input lines that are required may dictate that the drivers be placed on a separate printed circuit board from the grid. This in turn requires a large number of interconnects between this separate board and the grid; that is, one connection per conductor of the grid. In view of the fact that it is common to have a horizontal (X) grid on one side of the printed circuit board and a vertical (Y) grid on the other side of the same printed circuit board, a large number of connections must be made to such a grid. This increases the size and cost while at the same time reducing the reliability and serviceability of the system. In addition, the determination of the position of the stylus may require that all of the conductors in the grid be activated, depending on the location of the stylus. For example, if the stylus is located near one of the last conductors to be activated, then the search to find the position of the stylus will require the amount of time necessary to sequentially activate all of the conductors. In a very large grid, there may not be an adequate amount of time to perform this search and have an adequate number, of data points to define the path taken by a moving stylus.

Another prior art technique, which is utilized in the Model 4680 tablet manufactured by assignee's Applicon division, is to divide the grid into four blocks, each of which contains a plurality of juxtaposed conductors. The position of the stylus is determined by simultaneously activating one conductor from each block, each of which has the same relative position within the block. Once a stylus signal is detected, each of the conductors is separately energized to determine the block in which the stylus is located. Data points about this conductor are subsequently obtained to determine the exact position of the stylus by well known interpolation techniques. This technique solves the problem of the time required to scan all of the conductors of a large grid, here typically 440 conductors in the horizontal direction. However, it still requires the use of one driver per conductor of the grid, with the attendant problems discussed above.

Other prior art techniques include a grid network having a plurality of conductors defining a Gray Code pattern as shown in U.S. Pat. No. 3,709,956. Each of the conductors of the grid corresponds to a bit in the Gray Code. The stylus is located by sequentially passing a current through each of the conductors and detecting the phase of the voltage induced in an inductive pickup located in the stylus. Another Gray Code technique is shown in U.S. Pat. No. 3,819,857. Gray Code techniques do not lend themselves to interpolation between the conductors to obtain a more accurate location of the stylus.

U.S. Pat. No. 3,342,935 shows a system which utilizes a pulse technique to obtain a coarse location and a phase measurement to obtain a fine location of a stylus. This requires a counter to develop the pulses utilized for the coarse position location and a sine wave generator, phase shifters and coupling diodes for the fine position location.

SUMMARY OF THE INVENTION

It is a general object of the present invention to provide an approved method and apparatus for locating the position of a stylus on a grid of electrical conductors.

Another otject of the invention is to reduce the number of drivers required to energize the conductors of the grid.

A further object of the invention is to reduce the number of drivers to substantially twice the square root of the number of conductors utilized in conventional grid systems.

Yet another object of the present invention is to increase the speed of the search for the location of the stylus.

These and other objects, advantages and features are achieved by a method for determining at least one coordinate position of a stylus relative to a plurality of substantially parallel electrical conductors by grouping said conductors into two interleaved sets with the conductors of each of said sets being substantially equally spaced one from another. This forms a series of conductor pairs containing juxtaposed conductors of each of said sets. The first set is divided into subsets each containing a predetermined plurality of juxtaposed conductors and the second set is divided into subsets each containing a plurality of conductors equal to the number of subsets in said first set, where the $i^{th}$ subset of the second set contains the conductor pair mates to the conductors in the i$^{th}$ position in each subset of the first set, where i=1, 2, 3 ... m and m equals said predetermined plurality. Sequentially energizing at least one of the subsets of the first set, each subset being energized by a single driver connected to all of the conductors in said subset. The electric or magnetic field produced at said stylus by said energized conductors is detected to generate a coarse position signal representative of the coarse position of said stylus. Sequentially energizing at least one of the subsets of the second set, each subset being energized by a single driver connected to all of the conductors in said subset. The electric or magnetic field produced at said stylus by said energized conductors is detected to generate a fine position signal representative of the fine position of said stylus. The fine and coarse signals are combined to determine the position of the stylus.

Another aspect of the invention includes an electrographic system for determining at least one coordinate position of a stylus relative to a grid of electrical conductors comprising a first plurality of substantially parallel electrical conductors lying in a plane, each of said conductors being spaced one from the other by a predetermined distance. A second plurality of substantially parallel conductors being interleaved with and substantially coplanar with said first plurality, each of said conductors in said second plurality being spaced one from another and from juxtaposed conductors of the first plurality by said predetermined distance. This forms a series of conductor pairs containing juxtaposed conductors of each of said pluralities. A plurality of first driver means, each being connected to a predetermined number of juxtaposed ones of said first plurality of conductors and a plurality of second driver means, equal in number to said predetermined number, each of which is connected to a group of said second plurality of conductors. The conductors in said group are spaced one from the other by a number of conductors in said second plurality equal to the number of said first driver means. A means for sequentially activating each of said plurality of first driver means to sequentially energize the conductors connected thereto. A means for sequentially activating each of said plurality of second driver means to sequentially energize the conductors connected thereto. A means for detecting the electric or magnetic field produced at said stylus by said energized conductors to generate a coarse position signal representative of the coarse position of said stylus when said first plurality of drivers is activated and a fine position signal representative of the fine position of said stylus when said second plurality of drivers is activated. A means for combining said coarse and fine signals to generate a signal representative of the position of the stylus.

A further aspect of the invention comprises a grid for electrical conductors for use in an electrographics system for determining at least one coordinate position of a stylus relative to said grid comprising a first plurality of substantially parallel electrical conductors lying in a plane, each of said conductors being spaced one from the other by a predetermined distance. The conductors of said first plurality are divided into groups each comprising a predetermined number of juxtaposed conductors with all of the conductors of each group being connected together. A second plurality of substantially parallel conductors being interleaved with and substantially coplanar with said first plurality, each of said conductors of said second plurality being spaced one from another by said predetermined distance to form a series of conductor pairs containing juxtaposed conductors of each of said pluralities. The conductors of said second plurality are divided into groups each comprising a predetermined number of conductors, each of the conductors of the group being spaced one from the other by the number of groups of conductors in said first plurality, all of the conductors of each group being connected together. Each of the groups of both said first and second pluralities are adapted to be connected to separate drivers whereby the number of drivers required is equal to substantially twice the square root of the number of conductor pairs.

DETAILED DESCRIPTION

Figure 1:
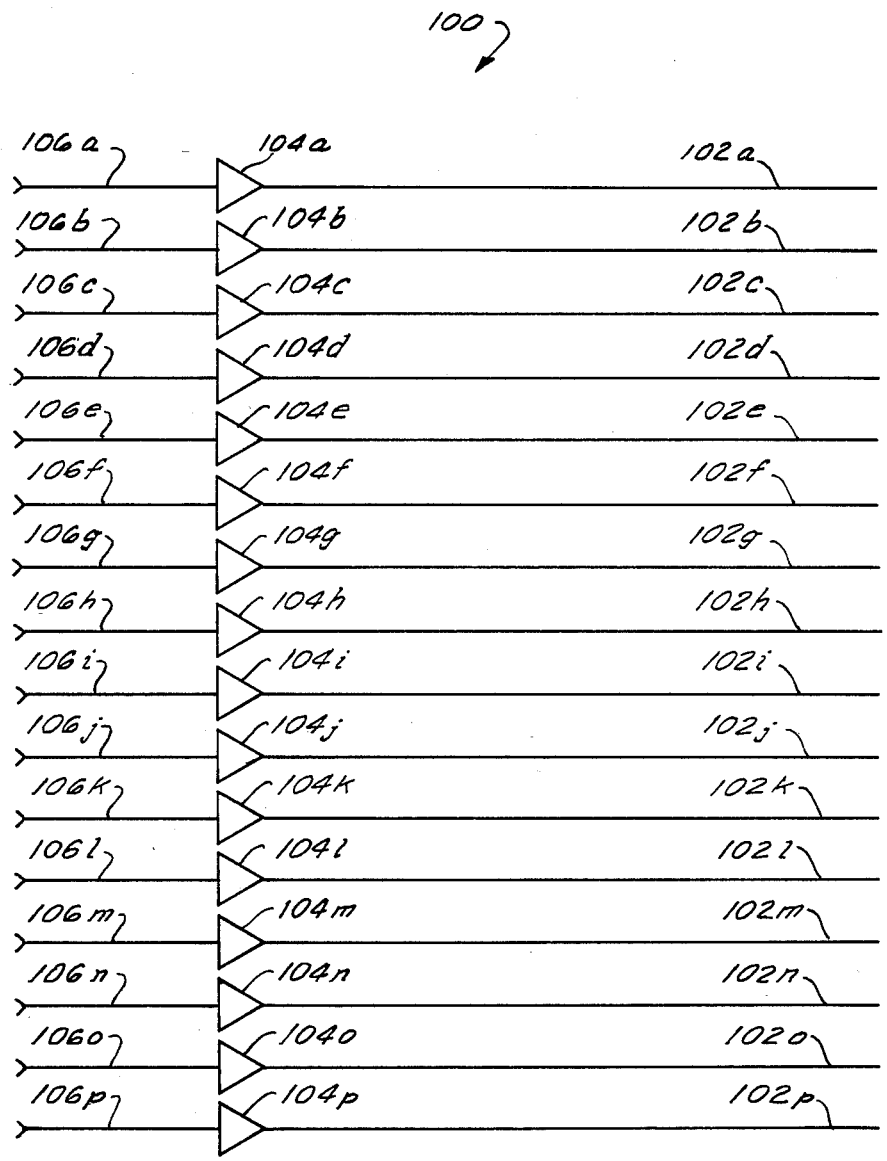
FIG. 1 is a schematic diagram of a grid system for locating a stylus in one dimension (Y) in accordance with the prior art.
Figure 2:
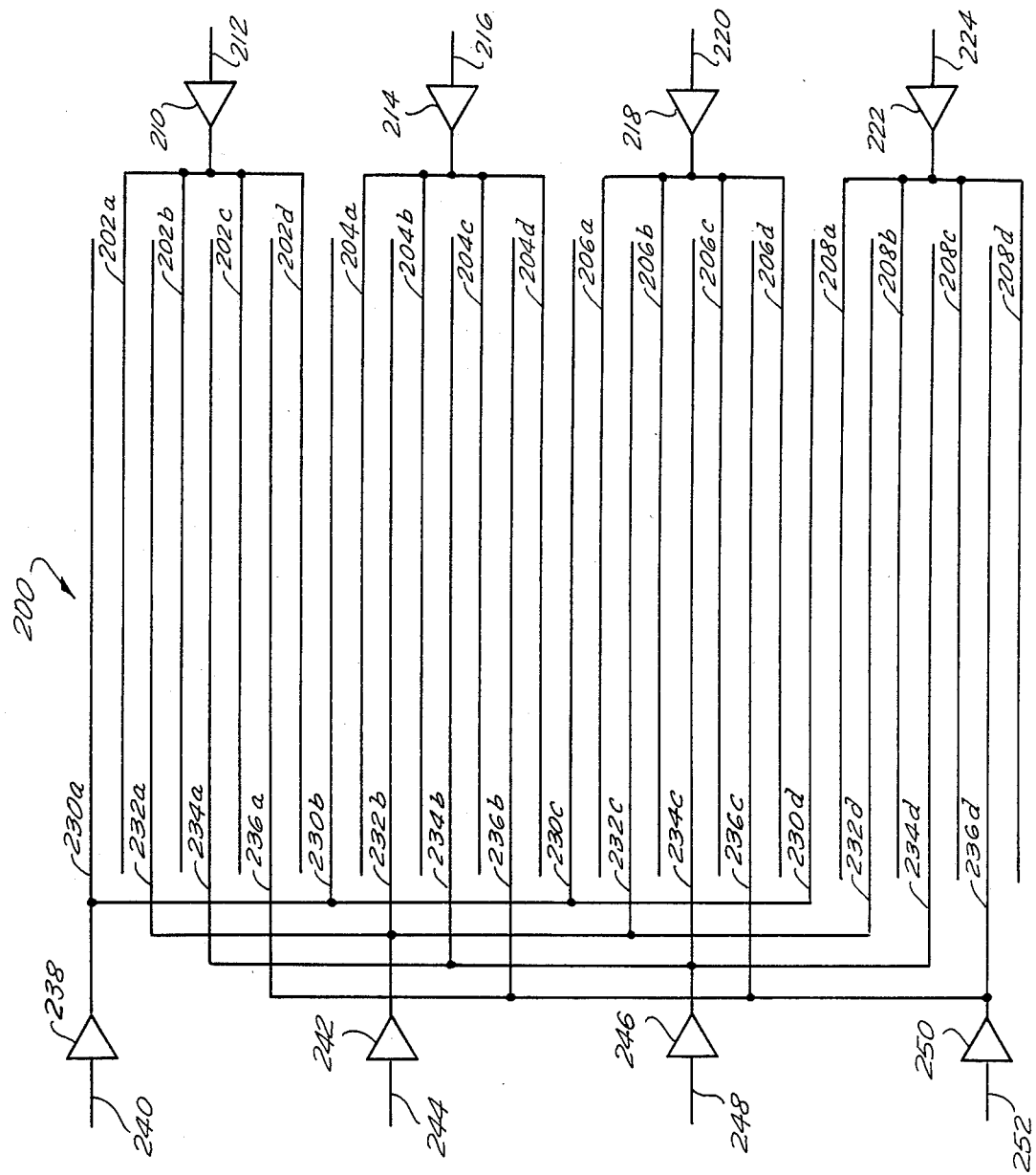
FIG. 2 is a schematic diagram of one embodiment of the grid of FIG. 1 made in accordance with the present invention.

Referring to FIG. 2, a grid in accordance with the present invention is generally shown as 200. This grid can locate the pen or stylus to substantially the same resolution as the grid shown in FIG. 1. In contrast to the grid shown in FIG. 1, the grid of FIG. 2 contains 32 conductors instead of the 16 conductors shown in FIG. 1. The conductors are arranged in two interleaved sets, or groups, with one set being utilized to determine the coarse position of the stylus and the other set being utilized to determine the fine position of the stylus. The spacing between one conductor and the other is equal for all 32 conductors. The conductors of the coarse and fine sets are coextensive in the horizontal (X) direction to define the active area of the grid in this direction. In order to avoid "end effects" it is desireable that the conductors extend beyond the active area in the horizontal (X) direction, so that, for purposes of analysis, the conductors can be considered as parallel lines of infinite length. The set of coarse conductors is divided into subsets, or subgroups, 202, 204, 206 and 208. Each of these subsets contains 4 conductors which are respectively numbered a through d. Each of the conductors in each of the coarse subsets are connected to each other and connected to the output of a single line driver. Subset 202 is connected to driver 210 which has an input 212, subset 204 is connected to driver 214 which has an input 216, subset 206 is connected to driver 218 which has an input 220 and subset 208 is connected to driver 222 which has an input 224.

The set of fine conductors are also arranged in subsets with all of the conductors in each subset being connected together and to the output of a single driver. Adjacent fine conductors are spaced from each other by the same distance as that between adjacent coarse conductors. Also, the two sets of conductors are interleaved so that a conductor from one set is placed parallel to and substantially half way between adjacent conductors of the other set. Thus, for example, fine conductor 232a is parallel to and equi-distant from coarse conductors 202a and 202b. The conductors in each of the fine subsets are spaced one from the other by the number of fine conductors equal to the number of coarse groups, which is equal to the number of coarse drivers. In the example illustrated in FIG. 2, there are four coarse subsets and thus four coarse line drivers. Consequently, conductor 230b, for example, is spaced four fine conductors away from conductor 230a, conductor 230c is spaced four fine conductors from conductor 230b and conductor 230d is spaced four fine conductors from conductor 230c. Conductors 230a, 230b, 230c and 230d are connected together and connected to the output of driver 238 which has an input 240. Subset 232 is connected to the output of driver 242 which has an input 244, subset 234 is connected to the output of driver 246 which has an input 248 and subset 236 is connected to driver 250 which has an input 252.

It should be noted that the subsets of coarse conductors comprise the conductors of the grid which are in close proximity to each other, adjacent ones of said conductors being separated by only one fine conductor. These coarse conductors can also be described in relation to their position within their subset. For example, we may choose the conductor nearest the top of the drawing in each coarse subset to be the first position, the conductor nearest this conductor would be in the second position and so on. For example, conductors 202a, 204a, 206a and 208a would be the first conductors in their respective subset. If we consider the fine conductors to be the mates of the corresponding coarse conductors, to form conductor pairs, for example, conductor 230a would be the mate of conductor 202a, conductor 230b would be the mate of conductor 204a, conductor 230c would be the mate of conductor 206a and conductor 230d would be the mate to conductor 208a. Since conductors 202a, 204a, 206a and 208a are in the first position in their respective coarse subsets, their mates would be part of the first fine subset. Thus, in general, the fine conductors in the $i^{th}$ fine subset are the mates to the coarse conductors in the $i^{th}$ position of its respective coarse subset, where $i=1, 2, 3 \ldots m$ and m equals the number of conductors in each coarse subset. Accordingly, the conductors in the second fine subset, which are conductors 232a, 232b, 232c and 232d and which are all connected to each other and to the output of driver 242 would be the mates, respectively, to coarse conductors 202b, 204b, 206b and 208b. A similar description applies to the third and fourth fine subsets.

It should be noted that because there must be one fine conductor for each course subset, the number of coarse subsets, which is equal to the number of coarse drivers, equals the number of fine conductors in each fine subset. In addition, because there must be a mate for each of the coarse conductors, the number of fine subsets must be equal to the number of conductors in each coarse subset. For example, if we had twenty conductor pairs divided into five coarse subsets of four conductors each, we would necessarily have four fine subsets of five conductors each.

The technique illustrated in FIG. 2 greatly reduces the number of drivers required to locate the position of a pen or stylus on the grid. The prior art technique illustrated in FIG. 1 required sixteen drivers whereas the technique illustrated in FIG. 2 requires only eight drivers, a reduction by 50%. It should be noted that, in general, commercial tablets employ grids having many more conductors than illustrated in FIGS. 1 or 2. For example, a 40 inch wide tablet would typically have 400 conductors across the width of the tablet. If the prior art technique is utilized, this requires 400 drivers. Using the present invention reduces this to 40 drivers, a reduction of 90%.

In general, the minimum number of drivers required for this technique equals twice the square root of the number of conductor pairs. For exaxple, in the case illustrated in FIG. 2, there are sixteen conductor pairs so that the formula yields eight drivers which is the number of drivers illustrated in the figure. Obviously, if the result of this formula is not a whole number, the number must be rounded off to the next highest whole number, because one cannot have a fraction of a driver. In addition, the number of drivers is minimized when (1) the number of conductor pairs is chosen to be a number which has an integer for a square root and (2) when the number of coarse groups and the number of conductors in each group are close to each other. The former condition reduces the number of drivers because it eliminates the necessity to round off to the next highest number of drivers because of the impossibility of having a fraction of a driver. The latter condition maximizes the use of each driver. For example, in the embodiment illustrated in FIG. 2, if we had chosen eight coarse groups of two conductors each, we would necessarily have two fine groups of eight conductors each, for a total of ten drivers. This is two more than the eight drivers shown in FIG. 2. Notice that in the embodiment illustrated in FIG. 2, there are four coarse groups of four conductors each, and this results in the minimum number of drivers for this number of conductor pairs.

This reduction in the number of drivers requires a doubling of the number of conductors in the grid. However, the conductors will typically be formed as conducting lines on a printed circuit board. Therefore, the increase in the number of conductors does not require an increase in the amount of material, time or labor utilized to produce the grid. In addition, it should be noted that present printed circuit board techniques can easily accommodate this increase in the number of conductors. Accordingly, the increase in the number of conductors does not increase the cost of the grid nor complicate its fabrication.

It should be noted that, while the embodiment in FIG. 2 only illustrates the determination of the coordinate position in one (Y) direction, it is coxmon in the art for the grid for one coordinate to be placed on the top plane of a printed circuit board while the grid for the other coordinate is placed on the bottom plane of the same printed circuit board. This results in a very cost effective manner of producing a two coordinate grid. In addition, the grid may be covered by a non-conductive layer, such as a plastic material, to protect the grid from being damaged by the stylus. While the drivers for the grid are shown in the drawing as being next to the grid, it should be obvious that these drivers need not be on the same printed circuit board as the grid. For the sake of clarity, FIG. 2 has been illustrated as having the coarse grids emanate from the right side of the drawing and the fine grids emanate from the left side of the drawing. However, present printed circuit board techniques allow for all of the conductors to emanate from a single side of the printed circuit board. This enables the use of slide-in mounting of the grid which provides easier assembly of the system and easier disassembly for servicing.

The grid of FIG. 2 is connected to appropriate circuitry which will be described in connection with FIG. 3. In operation, this circuitry provides a sequence of non-overlapping pulses which sequentially energize the conductors of the grid. The first pulse is coupled to the input 212 of the first driver 210 for the first coarse group. This pulse causes the driver to energize the four conductors 202a, 202b, 202c and 202d of the first coarse group. At this time appropriate circuitry, which will also be described in conjunction with FIG. 3, determines the amplitude of the signal induced in or capacitively coupled to the stylus. The second pulse is coupled to the input 216 of driver 214 which is used to activate the conductors 204a, 204b, 204c and 204d of the second coarse group. At the same time, the circuitry is activated to determine the amplitude of the voltage induced in or capacitively coupled to the stylus. The third and fourth pulses are coupled to the input 220 of driver 218 and the input 224 of driver 222 to activate the third coarse group 206 and the fourth coarse group 208, respectively. The amplitude of the voltage induced in or coupled to the stylus is determined during these pulses as well.

The circuitry then generates the first pulse to energize the fine conductors which is coupled to the input 240 of driver 238. Driver 238 responds to this pulse to activate fine conductors 230a, 230b, 230c, and 230d. At the same time, the circuitry is activated to determine the amplitude of the voltage induced in or capacitively coupled to the stylus. This procedure is repeated for the second, third and fourth pulses for the fine group which are respectively coupled to the input 244 of driver 242, input 248 of driver 246, and input 252 of driver 250. Driver 242 activates the conductors 232 of the second fine group, driver 246 activates the conductors 234 of the third fine group and driver 250 activates the conductors 236 of the fourth fine group. During the activation of each of the fine groups, the circuitry is activated to determined the amplitude of the voltage induced in or coupled to the stylus.

The detection of a signal above the noise during the activation of a particular coarse group determines a general area on the grid in which the stylus is located. The detection of a signal above the noise during the activation of a particular fine grid determines the relative location of the stylus within each coarse group. Ihus, combining the locations determined by the coarse and fine signals determines the exact location of the stylus. In general, it is desirable to locate the fine position with greater accuracy than the number of grids would allow. Therefore, the signals coupled to the stylus from the activation of a number of fine conductors are utilized to interpolate the position of the stylus so that it can be located at a point between fine conductors. One well known technique of doing this is to utilize the signals from the activation of a number of fine conductors to determine a curve of amplitude versus the position on the grid. The maximim point of this curve is calculated and is taken as the actual position of the stylus. This technique requires several data points on either side of the maxmium point in order for this calculation to be performed.

It should be noted that it is not absolutely necessary to activate all of the coarse or all of the fine subsets of the grid in order to determine the position of the stylus. Once the coarse position of the stylus is determined, it is not necessary to activate the remaining coarse subsets. Similarly, once enough data points are determined to calculate the fine position of the stylus, it is not necessary to activate the remaining fine conductors. However, there are certain situations which render the activation of all the coarse and all the fine groups to be beneficial. If the stylus were between two coarse groups, we would expect to detect signals induced in or coupled to the stylus from both of these coarse groups. In addition, we would expect to detect signals for both the first few and last few conductors in the fine groups. Absent such a finding, or in the event there are inconsistent findings, an error would be detected and the scanning process repeated or an error message displayed.

Figure 3:
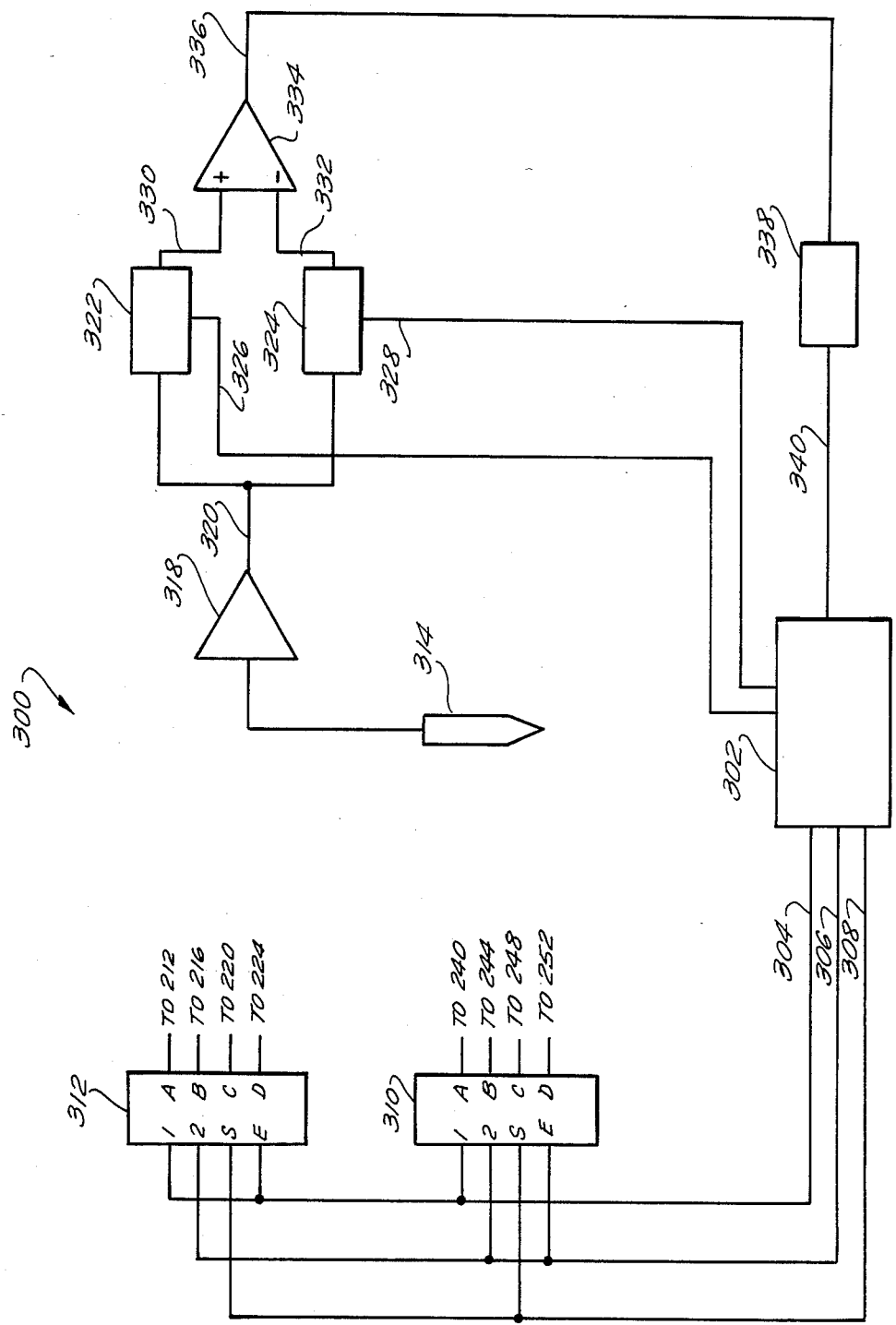
FIG. 3 is a schematic diagram of a circuit for providing a location system for a stylus utilizing the grid of FIG. 2.

Referring to FIG. 3, a circuit for use in conjunction with the grid of FIG. 2, is generally shown as 300. The circuit generates the pulses which activate the line drivers 210, 214, 218, 222, 238, 242, 246 and 250 shown in FIG. 2 to activate the conductors of the grid. The voltages generated on the conductors induce or capacitively couple a voltage to the stylus 314. The circuit provides the amplification, noise reduction and analog-to-digital conversion of this induced voltage so that the data can be utilized by a microprocessor 302 to generate a signal representative of the location of the stylus.

The operation of this circuit is controlled by microprocessor 302 which may include read only memory (ROM) circuits, random access mexory (RAM) circuits, addressing circuits for both the ROM and RAM memories, interface circuits for sending data to and receiving data from other portions of the circuit, and a clock. The microprocessor 302 is coupled to each of two decoder circuits 310, 312 via lines 304, 306 and 308. As illustrated in FIG. 3, decoders 310 and 312 are each one of four decoders. The signals on lines 304 and 306 are coupled to the inputs labelled 1 and 2, respectively, on the decoders. Each of the decoders decodes the address applied to terminals 1 and 2 to activate one and only one of the four output lines A, B, C and D. It should be noted, that in general, other types of decoders would be utilized in larger grids. Common decoders are one of eight (octal), one of ten (decade) and one of sixteen (binary) decoders. The choice of appropriate decoders depends on the size of the grid. In addition, although both decoders are shown as being identical, this is not required to practice the present invention.

The microprocesser 302 generates a two bit address by exercising a counting routine program stored in the ROM circuits of the microprocessor. This routine provides a two bit address code corresponding to four possible addresses on lines 304 and 306. This address code is provided in parallel to both decoders 310 and 312 at input lines 1 and 2. The address is loaded into both decoders by means of a strobe signal generated by microprocessor 302 on line 308 and coupled to the strobe inputs S of decoders 310 and 312. The enable input E of decoder 310 is coupled to line 306, and the enable input E of decoder 312 is coupled to line 304. After the address is loaded into both of the decoders, the address on lines 304 and 306 is changed such that only one of the decoders 310 or 312 will be enabled. This causes only one of the output lines of only one of the decoders to be activated. The outputs of the decoders 310 and 312 are coupled to the drivers shown in FIG. 2. The A output of decoder 312 is coupled to the input 212 of driver 210, the B output is coupled to input 216 of driver 214, the C output is coupled to the input 220 of driver 218 and the D output is coupled to the input 224 of driver 222. The A output of decoder 310 is coupled to the input 240 of driver 238, the B output is coupled to the input 244 of driver 242, the C output is coupled to the input 248 of driver 246 and the D output is coupled to the input 252 of driver 250. Thus, the outputs of decoder 312 can be utilized to activate the coarse conductor subsets of the grid and the outputs of decoder 310 can be used to activate the fine conductor subsets on the grid.

The counting routine continues to count until all four coarse groups and all four fine groups have been activated. In the event that the activation of the coarse or fine subsets is to be terminated as soon as the location of the pen is determined, this can easily be accomplished by a branch in the counting program, as well known to those skilled in the art.

The portion of the circuitry shown in the right side of FIG. 3 is utilized to detect the voltage induced in or coupled to the stylus by the voltage generated in the various conductors of the grid. The stylus 314 may have an inductive or a capacitive pickup, as well known to those skilled in the art. The voltage induced in or coupled to the stylus 314 is coupled via conductor 316 to the input of an amplifier 318 which increases the voltage to a more usable level and provides isolation between the stylus and the remainder of the circuit. The output of amplifier 318 is coupled via conductor 320 to the inputs of sample and hold circuits 322 and 324. These sample and hold circuits are controlled by signals generated by microprocessor 302 which is coupled to the sample and hold circuits via conductors 326 and 328, respectively. The output of sample and hold circuit 322 is coupled via conductor 330 to an input of differential amplifier 334. The output of sample and hold circuit 324 is coupled via conductor 332 to the other input of differential amplifier 334. Differential amplifier 334 provides an output signal on conductor 336 which is proportional to the difference between the input signals on conductors 330 and 332. This difference signal is coupled via conductor 336 to an analog-to-digital converter 338. The converter 338 digitizes the analog voltage applied at its input and couples a digital representation thereof to the microprocessor via conductor 340. Converter 338 may provide a parallel output, in which case line 340 is actually a multiple conductor having one wire for each bit in the digital representation of the analog voltage.

In operation, at the time when the microprocessor 302 enables one of decoders 310 or 312 to generate a voltage in one of the conductors of the grid, sample and hold circuit 322 is activated by a signal generated by microprocessor 302 to store a voltage proportional to the voltage induced in the stylus 314. During the time period when the next address is being loaded into the decoders 310 and 312 by the strobe signal and thus no voltage applied to the grid, sample and hold circuit 324 is activated by a signal generated by microprocessor 302 and coupled to it by conductor 328 to store a signal which is representative of the background signal or noise which is picked up by the stylus 314. Differential amplifier 334 subtracts the noise signal on conductor 332 from the desired signal on conductor 330 and provides an analog signal representative of this difference on conductor 336. This difference signal on conductor 336 represents the true value of the signal induced in or coupled to the stylus by the voltage generated in the conductor of the grid. This analog voltage is converted into a digital representation by the analog-to-digital converter 338. The digital representation of the analog voltage is provided on one or more conductors 340 to the microprocessor 302.

The microprocessor 302 will only read the digital representation on line 340 when the sample and hold circuits 322 and 324 have sampled both the induced signal and the background signal so that a true representation will appear at the output of the analog digital converter 338. The value of the signal and the address it represents are stored in the RAM circuits of the microprocessor and utilized to calculate the position of the stylus, as discussed above. Once the microprocessor 302 has calculated the position of the stylus, this information can be made available to external apparatus (not shown) for use or display. Because the microprocessor has an address or location which is represented by the measured voltage, the scanning sequence need not necessarily be in numerical order. Nor is it necessary that the sequence start from any particular point. This feature allows for the circuit to take advantage of the fact that styluses having a capacitive pickup rather than an inductive pickup will only produce a significant output signal when it is in close proximity to the grid. Accordingly, the system can be free running, that is, the microprocessor can continually scan the grid to determine the stylus' position. Before storing a measured voltage, the microprocessor compares the measured voltage against a predetermined threshold. If the voltage does not exceed the threshold, the microprocessor concludes that the capacitive stylus is not in proximity to the board, that no measurement should be made and that the position of the stylus should not be calculated. If the voltage exceeds the threshold, the microprocessor will store the digital representation of this voltage along with the stored address and proceed to compute the location of the stylus. If a stylus having an inductive pickup is utilized, a microswitch can be located at the point of the stylus to provide a signal to the microprocessor (not shown) when the stylus is depressed against the top of the grid. This signal can be utilized either with the free running system or to start the scanning sequence. Obviously, the microswitch system can also be utilized with a stylus having a capacitive pickup, if desired.

While a particular embodiment of the present invention has been disclosed herein, it would be obvious to those skilled in the art that certain changes and modifications can be made to it all included within the scope of the present invention. For example, it is possible to generate a voltage in the stylus 314 and measure the voltage induced in or coupled to the grid. In this case, a pulse would be applied to the stylus and the drivers 210, 214, 218, 222, 238, 242, 246 and 250 would be replaced with either gated amplifiers having their outputs tied together and coupled to the sample and hold circuits 322, 324 or multiplexor gates having their outputs coupled together and coupled to the input of amplifier 318. The other portions of the circuit can remain basically unchanged.

All such changes and modifications can be made without departing from the invention as defined by the appended claims.

I claim:

1. A method for determining at least one coordinate position of a stylus relative to a plurality of substantially parallel electrical conductors comprising the steps of:
    (a) grouping said conductors into two interleaved sets, the conductors of each of said sets being substantially equally spaced from and parallel to each other, to form a series of conductor pairs containing juxtaposed conductors of each of said sets, said first set being divided into subsets each containing a predetermined plurality of juxtaposed conductors of that subset, said second set being divided into subsets each containing a plurality of conductors equal to the number of subsets in said first set, where the $i^{th}$ subset of the second set contains the conductor pair mates to the conductors in the $i^{th}$ position in each subset of the first set, where i=1, 2, 3 ... m and m equals said predetermined plurality;

(b) sequentially energizing at least one of the subsets of the first set, each subset being energized by a single driver connected to all of the conductors in said subset;

(c) detecting the electric or magnetic field produced at said stylus by said energized conductors to generate a coarse position signal representative of the coarse position of said stylus;

(d) sequentially energizing at least one of the subsets of the second set, each subset being energized by a single driver connected to all of the conductors in said subset;

(e) detecting the electric or magnetic field produced at said stylus by said energized conductors to generate a fine position signal representative of the fine position of said stylus;

(f) combining said first and second signals to determine the position of said stylus.

2. The method of claim 1 wherein subsets of the first set are sequentially energized until the coarse position of the stylus is determined at which point the energization sequence is stopped with all other subsets of the first set remaining unenergized.

3. The method of claim 2 wherein subsets of the second set are sequentially energized until the fine position of the stylus is determined at which point the energization sequence is stopped with all other subsets of the second set remaining unenergized.

4. The method of claim 1 wherein all of the conductors of said sets are parallel to, substantially coextensive with and equally spaced from each other, and said subsets of said first and second sets are energized in a predetermined order unti a signal representative of the detected electric field produced by the energized conductors exceeds a predetermined threshold indicative of the stylus being in close proximity to the grid at which point the energization sequence is stopped;

storing said signal;

sequentially energizing all other unenergized subsets of said first and second sets;

detecting and storing a signal respresentative of the electric field produced by the energizing of said other subsets;

determining the position of said stylus from said stored signals.

5. The method of claim 4 wherein the fine position of the stylus is interpolated from the signals representative of the electric field generated by energizing the conductors of the second set by determining a curve of axplitude versus grid position and calculating a maxmium point of the curve.

6. The method of claim 1 wherein all of the conductors of said sets are parallel to, substantially coextensive with and equally spaced from each other and are grouped so that the number of conductors in each subset of the first set and the number of such subsets are as close as possible to being equal.

7. An electographic system for determining at least one coordinate position of a stylus relative to a grid of electrical conductors comprising:

(a) a first plurality of substantially parallel electrical conductors lying in a plane, each of said conductors being spaced one from the other by a predetermined distance;

(b) a second plurality of substantially parallel conductors being interleaved with and substantially coplanar with said first plurality, each of said conductors in said second plurality being spaced one from another by said predetermined distance to form a series of conductor pairs containing juxtaposed conductors of each of said pluralities;

(c) a plurality of first driver means, each being connected to a predetermined nunber of juxtaposed ones of said first plurality of conductors;

(d) a plurality of second driver means, equal in number to said predetermined number, each being connected to a group of said second plurality of conductors, the conductors in said group being spaced one from the other by a number of conductors in said second plurality equal to the number of said first driver means;

means for sequentially activating each of said plurality of first driver means to sequentially energize the conductors connected thereto;

(f) means for sequentially activating each of said plurality of second driver means to sequentially energize the conductors connected thereto;

(g) means for detecting the electric or magnetic field produced at said stylus by said energized conductors to generate a coarse position signal representative of the coarse position of said stylus when said first plurality of drivers is activated and a fine position signal representative of the fine position of said stylus when said second plurality of drivers is activated;

(h) means for combining said coarse and fine signals to generate a signal representative of the position of the stylus.

8. The apparatus of claim 7 wherein said conductors of said grid are substantially coextensive and equally spaced from each other, each of said conductors comprising a conducting line formed on a printed circuit board.

9. The apparatus of claim 8 wherein there are approximately 10 conductor pairs per inch of active grid area.

10. The apparatus of claim 8 wherein said means for sequentially activating said plurality of first driver means comprises a first decoder having separate output lines connected to each driver in said first plurality, said first decoder activating only one of said output lines in response to a binary address signal applied to its input; and said means for sequentially activating said plurality of second driver means comprises a second decoder having separate output lines connected to each driver in said second plurality, said second decoder activating said output lines in response to a binary address signal applied to its input.

11. The apparatus of claim 10 wherein the binary addresses applied to the inputs of said first and second decoders are generated by a microprocessor, said microprocessor producing a stream of such addresses for sequentially activating all of said conductors.

12. The apparatus of claim 8 wherein said means for detecting comprises a capacitive pickup mounted in said stylus; an amplifier coupled to said pickup and a sample and hold circuit coupled to an output of said amplifier, said sample and hold circuit being controlled by a microprocessor, said microprocessor activating said sample and hold circuit when one of said groups of conductors is energized.

13. The apparatus of claim 12 further comprising a second sample and hold circuit coupled to said output of said amplifier and being controlled by said microprocessor, said microprocessor activating said second sample and hold circuit when none of said groups of conductors is activated to obtain a measure of background noise picked up by said capacitive pickup on said stylus.

14. The apparatus of claim 13 further comprising a differential amplifier having one input coupled to said first sample and hold circuit and a second input coupled to said second sample and hold circuit for generating a difference signal representative of the difference between the signals stored by said sample and hold circuits; an analog-to-digital converter coupled to an output of said differential amplifier and a microprocessor coupled to an output of said analog-to-digital converter.

15. The apparatus of claim 14 wherein said microprocessor stores said digital representations of an amplitude of said electric field and determines the position of said stylus from said stored values.

16. The apparatus of claim 8 wherein said stylus contains a capacitive pickup for detecting the electric field produced by energizing said conductors; and further comprising means for determining if said detected electric field exceeds a predetermined threshold.

17. The apparatus of claim 16 wherein said means for sequentially activating said first driver means and said means for sequentially activating said second driver means are free running whereby the output of said determing means is indicative of whether the stylus is close enough to said grid for determining its position.

18. A grid of electrical conductors for use in an electrographics system for determining at least one coordinate position of a stylus relative to said grid comprising:

(a) a first plurality of substantially parallel electrical conductors lying in a plane, each of said conductors being spaced one from another by a predetermined distance, the conductors of said first plurality being divided into groups each comprising a predetermined number of juxtaposed conductors, all of the conductors of each group being connected together;

(b) a second plurality of substantially parallel conductors being interleaved with, and substantially coplanar with said first plurality, each of said conductors of said second plurality being spaced one from another by said predetermined distance to form a series of conductor pairs containing juxtaposed conductors of each of said pluralities; the conductors of said second plurality being divided into groups each comprising a predetermined number of conductors, each of the conductors of the group being spaced one from the other by the number of groups of conductors in said first plurality, all of the conductors of each group being connected together;

each of the groups of both said first and second pluralities being adapted to be connected to separate drivers whereby the number of drivers required is equal to substantially twice the square root of the number of conductor pairs.

19. The grid of claim 18 wherein the conductors are substantially coextensive, and the conductors of the second plurality are spaced from juxtaposed ones of the conductors of said first plurality by said predetermined distance.

20. The grid of claim 19 wherein the conductors are conducting lines formed on a printed circuit board.

* * * * *